(12) United States Patent
Deus

(10) Patent No.: US 9,547,704 B1
(45) Date of Patent: Jan. 17, 2017

(54) EMAIL ROBUSTNESS CHECKING

(71) Applicant: Google Inc., Mountain View, CA (US)

(72) Inventor: Kevin Deus, Kirkland, WA (US)

(73) Assignee: GOOGLE INC., Mountain View, CA (US)

( * ) Notice: Subject to any disclaimer, the term of this patent is extended or adjusted under 35 U.S.C. 154(b) by 302 days.

(21) Appl. No.: 14/024,523

(22) Filed: Sep. 11, 2013

Related U.S. Application Data

(60) Provisional application No. 61/717,010, filed on Oct. 22, 2012.

(51) Int. Cl.
*G06F 17/30* (2006.01)

(52) U.S. Cl.
CPC .............................. *G06F 17/30575* (2013.01)

(58) Field of Classification Search
CPC ....................... G06F 17/30067; H04L 67/1095
IPC ........................................................ G06F 17/30
See application file for complete search history.

(56) References Cited

U.S. PATENT DOCUMENTS

| | | | | |
|---|---|---|---|---|
| 7,606,837 B2* | 10/2009 | Shields | ............... | H04L 67/1095 |
| 2004/0133644 A1* | 7/2004 | Warren et al. | ................ | 709/206 |
| 2004/0177319 A1* | 9/2004 | Horn | ........................... | 715/501.1 |
| 2006/0248155 A1* | 11/2006 | Bondarenko | ........ | G06Q 10/107 |
| | | | | 709/206 |
| 2008/0095336 A1* | 4/2008 | Tysowski | .......... | H04M 1/72552 |
| | | | | 379/88.22 |
| 2009/0312033 A1* | 12/2009 | Shen | ....................... | H04W 4/02 |
| | | | | 455/456.1 |
| 2011/0219035 A1* | 9/2011 | Korsunsky | .............. | G06F 17/30 |
| | | | | 707/784 |
| 2012/0005283 A1* | 1/2012 | Provo et al. | .................. | 709/206 |
| 2012/0221651 A1* | 8/2012 | Rabii | ............................ | 709/206 |
| 2013/0238730 A1* | 9/2013 | Nir et al. | ....................... | 709/206 |

* cited by examiner

*Primary Examiner* — Mohammad S Rostami
(74) *Attorney, Agent, or Firm* — Morgan, Lewis & Bockius LLP

(57) ABSTRACT

To synchronize data stored by a first device (e.g., a client system) with data stored by a second device (e.g., a server system), the first device encodes a first set of ordered data identifiers, stored in memory of the first device, to produce an encoded value, wherein the first set of ordered data identifiers is bound in accordance with a range indicator, and transmits the encoded value and the range indicator to the second device. The first device subsequently receives from the second device a remedial set of ordered data identifiers stored in memory of the second device when the encoded value does not match a corresponding value determined by the second device, wherein the remedial set of ordered data identifiers is also bound in accordance with the range indicator.

28 Claims, 8 Drawing Sheets

EMAIL ROBUSTNESS CHECKING

RELATED APPLICATIONS

This application claims priority to U.S. Provisional Patent Application No. 61/717,010, filed Oct. 22, 2012, which is hereby incorporated by reference in its entirety.

TECHNICAL FIELD

The present disclosure generally relates to computer-implemented methods of validating data in multiple locations, and in particular, to methods of email synchronization.

BACKGROUND

Mobile data networks and network-based computing allow users to access data using various devices and at various locations. For example, during any given day a user may access an email account from a laptop computer at home, a personal computer at work, a tablet computer and/or a smart-phone while commuting, etc. However, when storing the same data, such as emails, in multiple locations there are a variety of potential errors or failures that can cause the data stored on a particular device to become out of synch with corresponding data stored on a data server (e.g., an email server) or another device.

SUMMARY

In some embodiments, to synchronize data stored by a first device (e.g., a client system) with data stored by a second device (e.g., a server system), the first device encodes a first set of ordered data identifiers, stored in memory of the first device, to produce an encoded value. The first set of ordered data identifiers is bound in accordance with a range indicator, and the first device transmits the encoded value and the range indicator to the second device. The first device subsequently receives from the second device a remedial set of ordered data identifiers stored in memory of the second device when the encoded value does not match a corresponding value determined by the second device. The remedial set of ordered data identifiers is also bound in accordance with the range indicator.

In some embodiments, to synchronize data stored by a first device (e.g., a server system) with data stored by a second device (e.g., a client system), the first device receives from the second device information associated with a first set of ordered data identifiers stored on the second device, the information including a first encoded value and a range indicator associated with the first set of data identifiers. The first device encodes a second set of ordered data identifiers that are stored on the first device and that are associated with the received range indicator, to produce a second encoded value, and determines whether the first set of data identifiers matches the second set of data identifiers by at least comparing the first encoded value to the second encoded value. In response to determining that the first encoded value does not match the second encoded value, the first device initiates a remedial process.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DETAILED DESCRIPTION

Figure 1:
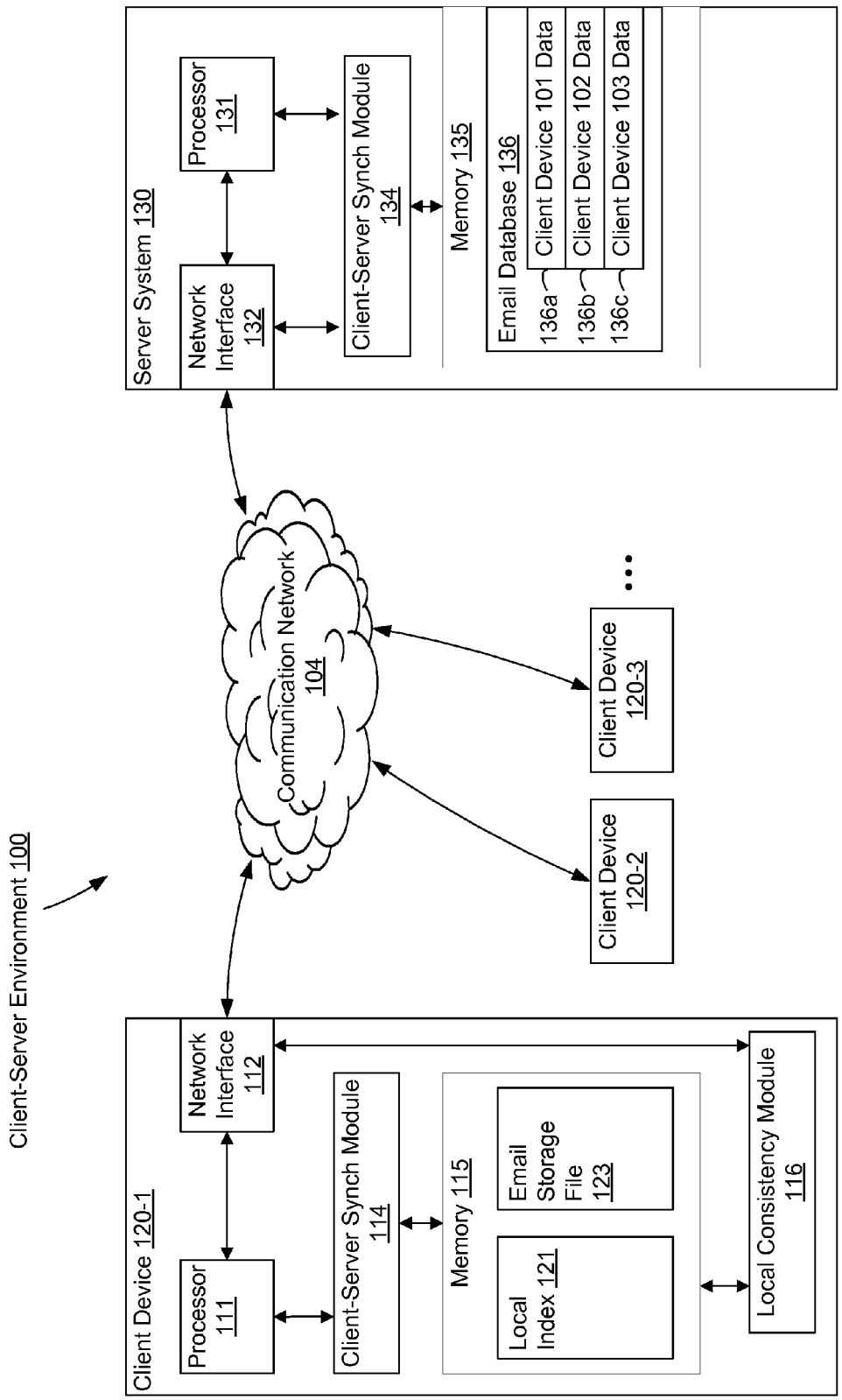
FIG. 1 is a block diagram of a client-server environment, in accordance with some embodiments.

It will be understood that, although the terms "first," "second," etc. may be used herein to describe various elements, these elements should not be limited by these terms. These terms are only used to distinguish one element from another. For example, a first entity could be termed a second entity, and, similarly, a second entity could be termed a first entity, without changing the meaning of the description, so long as all occurrences of the "first entity" are renamed consistently and all occurrences of the second entity are renamed consistently. The first entity and the second entity are both entities, but they are not the same entity.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made to various implementations, examples of which are illustrated in the accompanying drawings. In the following description, numerous details are set forth in order to provide an understanding of some aspects of the disclosed implementations. However, various embodiments may be practiced without these specific details. Moreover, well-known methods, procedures, components, and circuits have not been described in exhaustive detail so as not to unnecessarily obscure more pertinent aspects of the disclosed implementations.

Implementations of systems, methods and devices described herein enable validation and synchronization of data stored in multiple locations. In some implementations systems, methods and devices are enabled to check whether data stored on a particular device is up-to-date (i.e., synchronized) with respect to other data that is also stored locally, and also with respect to corresponding data stored on another device. For example, according to a first aspect of some implementations, systems, methods and devices are enabled to check whether email messages stored in an email storage file match email message identifiers stored in a separate local index or log. Optionally, the local index or log is stored on the same device as the email storage file. If the respective contents of the email storage file and the local index do not match, the systems, methods and devices are enabled to take remedial action to correct the disparity. According to a second aspect of some implementations, systems, methods and devices are enabled to check whether the emails stored on a client device are in synch with the emails stored on a server or a second device, and take remedial action when mismatches are identified.

FIG. 1 is a block diagram of a distributed client-server system 100 according to some implementations. While certain features are illustrated, those skilled in the art will appreciate from the present disclosure that various other features have not been illustrated for the sake of brevity and so as not to obscure more pertinent aspects of the implementations disclosed herein. Distributed client-server system 100 includes one or more client devices 120-1, 120-2, 120-3, one or more server systems 130, and a communication network 104 for connecting the client devices to server system 130. While only a single server system 130 and three client devices 120 are illustrated in FIG. 1, those skilled in the art will appreciate from the present disclosure that a client-server environment may include any number of server systems and client devices. Communication network 104 optionally includes the Internet, one or more wired or wireless local area networks (LANs), one or more wide area networks (WANs), other types networks, or a combination of such networks. Communication network 104 provides communication capability between client devices 120 and server system 130. In some implementations, the communication network 104 uses the HyperText Transport Protocol (HTTP) to transport information using the Transmission Control Protocol/Internet Protocol (TCP/IP). However, the various implementations described herein are not limited to the use of any particular signaling or communication protocol.

In some implementations, server system 130 is implemented as a single server system, while in other implementations it is implemented as a distributed system of multiple servers. Solely for convenience of explanation, server system 130 is described below as being implemented on a single server system. In some implementations, server system 130 includes a network interface 132, one or more processors 131 for executing programs, a client-server synch module 134, and memory 135 (i.e., a non-volatile computer readable storage medium). Network interface 132 facilitates communication through the communication network 104.

In some implementations, client-server synch module 134 enables validation of data stored on server system 130 and multiple client devices 120. To that end the client-server synch module 134 may include any suitable combination of hardware, software and firmware. For example, the various methods described below may be implemented in software as sets of instructions or as logic on an application specific integrated circuit.

In some implementations, memory 135 includes an email database 136. In the example shown in FIG. 1, email database 136 includes respective client device data 136a, 136b, 136c associated with corresponding client devices 120-1, 120-2, 120-3. Stated another way, email database 136 includes respective client device data 136a, 136b, 136c for user accounts that are accessed using client devices 120-1, 120-2, 120-3. Generally, server system 130 includes up-to-date data for respective user accounts, and thus for each client device 120, although there may be instances in which a particular client device 120 has more up-to-date data than the server. Nevertheless, those skilled in the art will appreciate from the present disclosure that validating data on a respective client device 120 may include both updating the data on the client device with more up-to-date data from server system 130, and updating the data on server system 130 with more up-to-date data from the respective client device 120.

Client device 120-1 includes features that may be common to other client devices such as client devices 120-2, 120-3. As such, while the description herein focuses on client device 120-1, those skilled in the art will appreciate that in some implementations client devices 120-2, 120-3 include similar features even though those features are not illustrated or discussed in this document for the sake of brevity.

Client device 120-1 is any suitable computer device that is capable of connecting to server system 130 via communication network 104, such as a computer, a laptop computer, a tablet device, a netbook, an internet kiosk, a personal digital assistant, a mobile phone, a smart phone, a gaming device, or any other device that is capable of communicating with server system 130. In some implementations, client device 120-1 includes one or more processors 111 (sometimes called CPUs, microprocessors, etc.), a network interface 112, memory 115, a client-server synch module 114, a local consistency module 116, and various other user interface components (e.g., one or more of: a display, speakers, microphone, etc.) Client device 120-1 optionally (and typically) includes one or more input devices such as a keyboard, a mouse and/or track-pad (not shown). Optionally, client device 120-1 includes a touch screen display, a digital camera and/or any number of supplemental devices to add functionality. Memory 115 includes a non-volatile computer readable storage medium.

Network interface 112 facilitates communication between client device 120-1 to other systems or devices through communication network 104. In some implementations, client-server synch module 114 is provided to enable validation of data stored on client device 120-1 and server system 130 and/or other devices. To that end, client-server synch module 114 includes any suitable combination of hardware, software and firmware. For example, the various methods described below may be implemented in software as sets of instructions or as logic on an application specific integrated circuit.

In some implementations, local consistency module 116 is provided to enable validation of data stored on client device 120-1 against other locally stored data. For example, in some implementations associated with storing emails on a client device, client device 120-1 includes an email storage file 123 and a local message index 121 that stores message identifiers of messages that should be present in the email storage file 123. In some implementations, memory 115 stores both email storage file 123 and local message index 121. In some implementations, as compared to email storage file 123, local message index 121 represents a more reliable indication of the email messages previously provided to client device 120-1 from server system 130. In some implementations, local message index 121 is more reliable because the contents of local message index 121 are written into a local non-volatile memory (memory 115) more frequently and/or with less delay after modifications to locally stored messages than are updates to email storage file 123. As such, the content of local message index 121 may be less susceptible to errors or losses of information caused by communication interruptions, software execution interruptions, or other failures. Moreover, while in some implementations local message index 121 serves as the more reliable listing of data identifiers, those skilled in the art will appreciate from the present disclosure that any number of file types or identifiable memory allocations may serve as the more reliable listing of data identifiers that may be used to validate data in other less reliable file types or identifiable memory locations.

Figure 2:
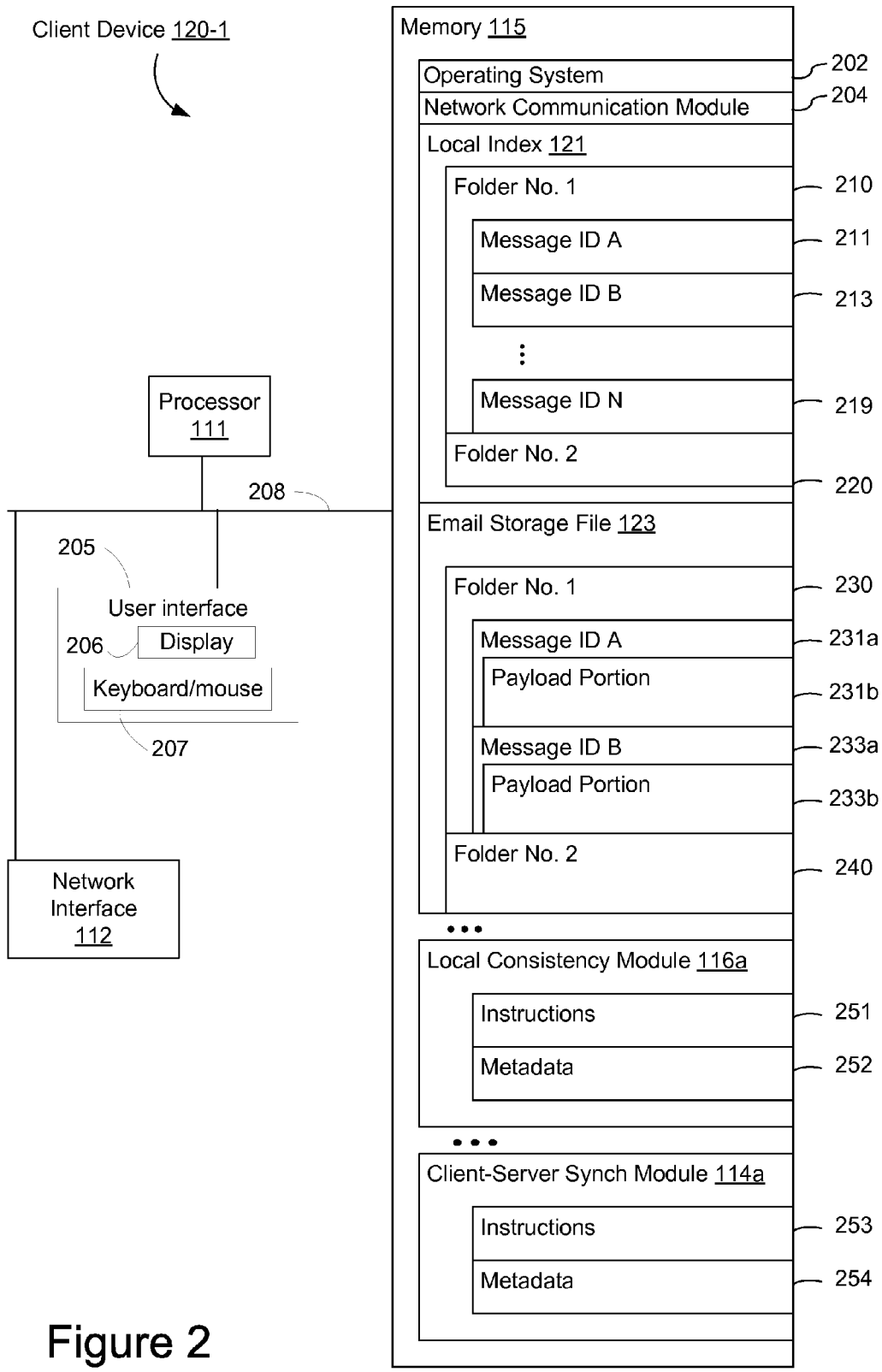
FIG. 2 is a block diagram of an implementation of a client device, in accordance with some embodiments.

FIG. 2 is a more detailed block diagram of the client device 120-1 shown in FIG. 1. In some implementations, client device 120-1 includes one or more processors (111) for executing programs stored in memory 115, one or more communications interfaces such as network interface 112, memory 115, a user interface 205 comprising a display 206 and input device 207 (e.g., a keyboard, mouse or track-pad), and one or more communications buses 208 for interconnecting these components. Communication buses 208 optionally include circuitry (sometimes called a chipset) that interconnects and controls communications between system components. Memory 115 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 115 optionally includes one or more storage devices remotely located from the one or more processors 111. Memory 115, or alternatively the non-volatile memory device(s) within memory 115, comprises a non-transitory computer readable storage medium. In some embodiments, memory 15 or alternatively the non-transitory computer readable storage medium stores the following programs, modules and data structures, or a subset thereof:

- Operating System 202 that includes procedures for handling various basic system services and for performing hardware dependent tasks;
- Network Communication Module (or instructions) 204 that is used for connecting Client 120-1 to other computers (e.g., Server System 130) via one or more Network Interfaces 112 (wired or wireless) and one or more Communication Networks 104 (FIG. 1), such as the Internet, other wide area networks, local area networks, metropolitan area networks, and so on;
- client-server synch module 114a, which enables validation of data stored on client device 120-1 and server system 130 and/or other devices;
- local consistency module 116a, which enables validation of data stored on client device 120-1 against other local stored data;
- local index 121, and
- email storage file 123.

In some implementations, as shown in FIG. 2, client-server synch module 114a includes instructions 253 (for execution by one or more processors 111) and metadata 254 associated with that function. In some implementations, local consistency module 116a includes instructions 251 (for execution by one or more processors 111) and metadata 252 associated with that function.

As an example, local index 121 includes messages identifiers sorted into first and second folders 210, 220. In this example, the first folder 210 includes message identifiers 211, 213 . . . 219. Similarly, the email storage file 123 includes message identifiers 231a, 233a and corresponding payload portions 231b, 233b associated with each message identifier, which are also sorted into first and second folders 230, 240. In this example, the first message identifier 231a has a corresponding payload portion 231b (e.g., a corresponding electronic mail message), and the second message identifier 233a has a corresponding payload portion 233b (e.g., a corresponding electronic mail message).

Figure 3:
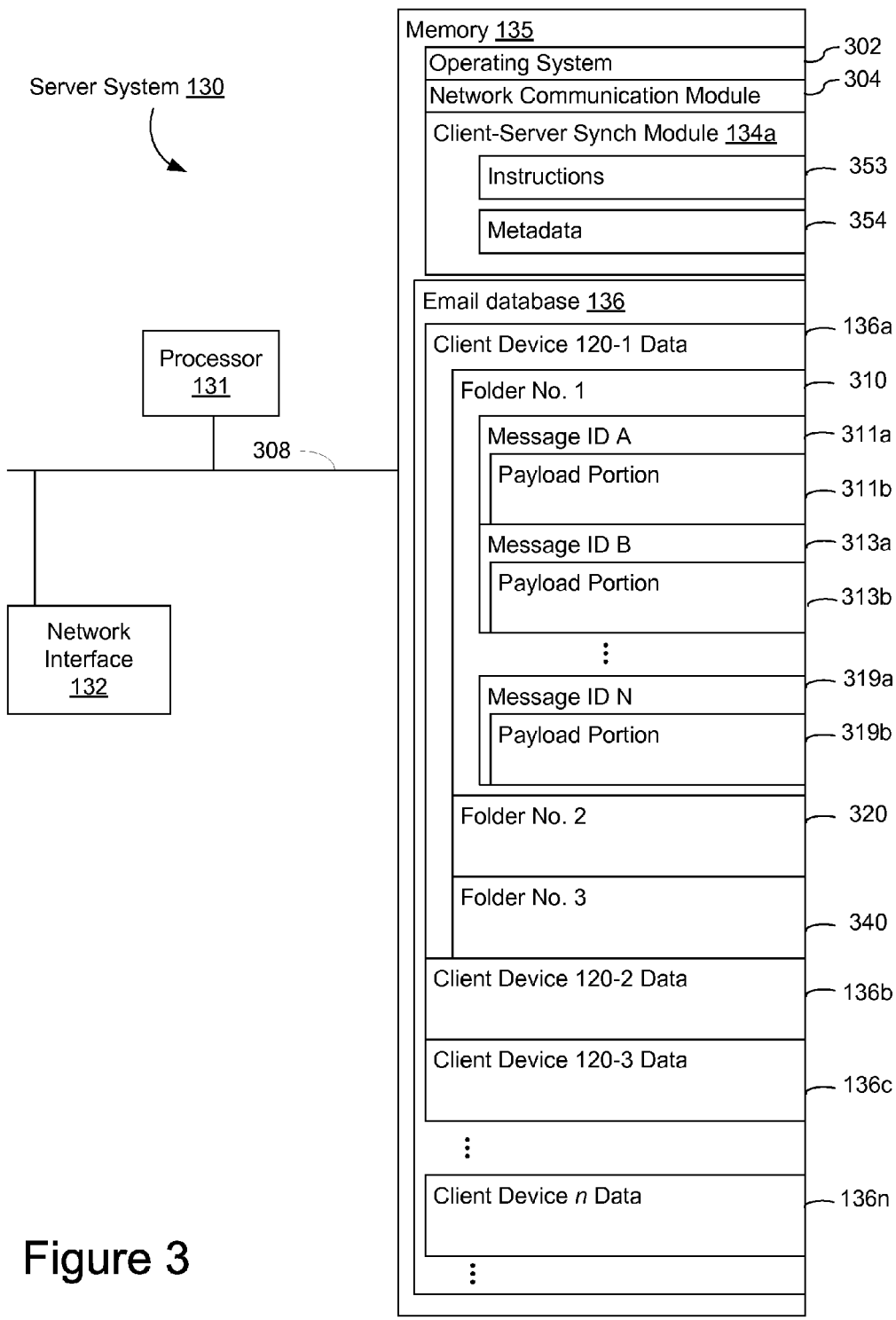
FIG. 3 is a block diagram of an implementation of a server system, in accordance with some embodiments.

FIG. 3 is a block diagram of server system 130, also shown in FIG. 1. Server System 130 includes one or more processors (131) for executing programs stored in memory 135, one or more communication interfaces such as network interface 132, memory 135, and one or more communication buses 308 for interconnecting these components. Communication Buses 308 optionally include circuitry (sometimes called a chipset) that interconnects and controls communications between system components. Memory 135 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 135 optionally includes one or more storage devices remotely located from the one or more processors 131. Memory 135, or alternatively the non-volatile memory device(s) within memory 135, comprises a non-transitory computer readable storage medium. In some embodiments, memory 135 or alternatively the non-transitory computer readable storage medium stores the following programs, modules and data structures, or a subset thereof:

- Operating System 302 that includes procedures for handling various basic system services and for performing hardware dependent tasks;
- Network Communication Module (or instructions) 304 that is used for connecting Server System 130 to other computers (e.g., Client 120-1) via one or more Network Interfaces 132 (wired or wireless) and one or more Communication Networks 104 (FIG. 1), such as the Internet, other wide area networks, local area networks, metropolitan area networks, and so on;
- client-server synch module 134a; and
- email database 136.

As noted above, client-server synch module 134a, is provided to enable validation of data stored one or more client devices and server system 130. As shown in FIG. 3, client-server synch module 134a includes instructions 353 (for execution by the one or more processors 131 of server system 130) and metadata 354 associated with that function.

In the example provided in FIG. 3, email database 136 includes respective client device data 136a, 136b, 136c associated with corresponding client devices 120-1, 120-2, 120-3. Each allotment of client device data 136a, 136b, 136c . . . 136n includes message identifiers and corresponding payload portions, typically including a respective payload portion for each message identifier. In some implementations, the messages (i.e., message identifiers and message payload portions) in the client device data 136x (associated within a corresponding client device 120-*x*) is optionally sorted by folders, depending on the preferences of a particular user. For example, client device data 136*a* includes three folders 310, 320, and 340. The first folder 310 includes a first message identifier 311*a* and a corresponding payload portion 311*b*, a second message identifier 313*a* and a corresponding payload portion 313*b*, and a third message identifier 319*a* and a corresponding payload portion 319*b*.

Figure 4:
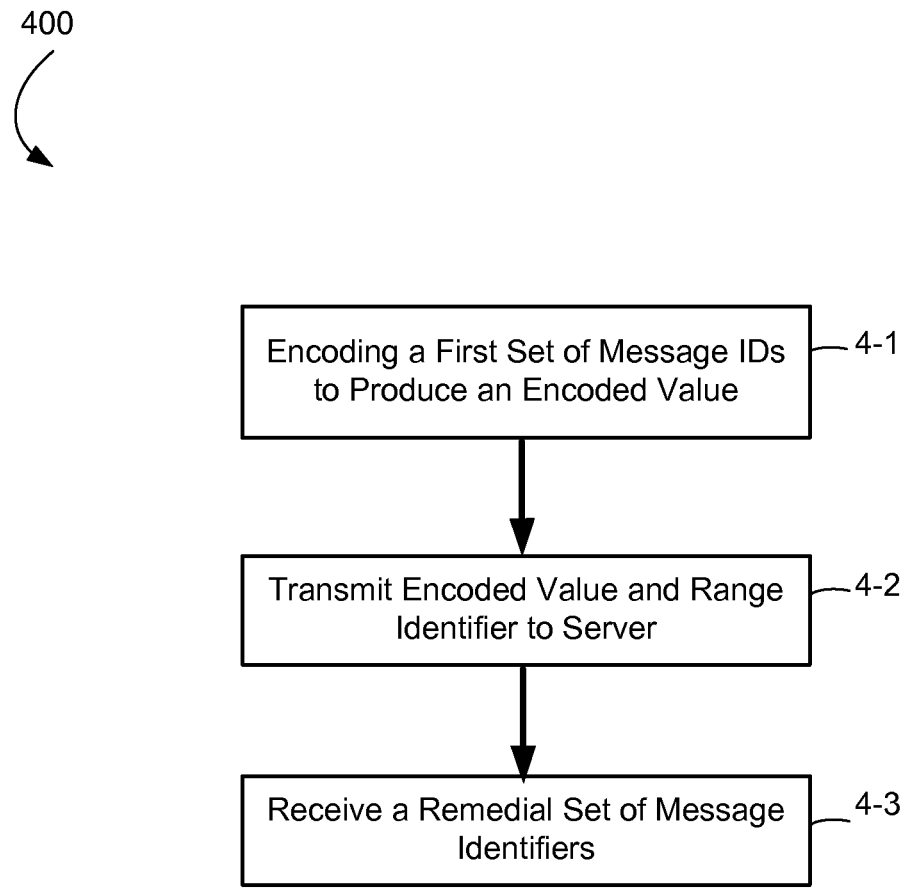
FIG. 4 is a flowchart of an implementation of a client device method, in accordance with some embodiments.

FIG. 4 is a flowchart of an implementation of a client device method 400. In some implementations, method 400 is performed by a client device (e.g., client device 120-1, such as a smart-phone, tablet, laptop, personal computer, etc.) in order to check that data stored on the device is up-to-date with respect to other locally stored data (e.g., a log file) and with respect to data stored on a server system (e.g., an email server). To that end, as represented by block 4-1, method 400 includes encoding a first set of message identifiers (called "message IDs" in FIG. 4) to produce an encoded value. In some implementations the set of message identifiers is encoded along with a storage label (e.g., a label identifier or folder identifier associated with the set of message identifiers). For example, in some implementations in which messages are organized into folders, or are labeled with labels, the set of message identifiers are message identifiers all having the same label or folder, and the encoding of the first set of message identifiers includes encoding a storage label that comprises a label identifier or folder identifier of the label or folder.

Additionally and/or alternatively, in some implementations the set of message identifiers is encoded without regard to a label or folder identifier. Those skilled in the art will also appreciate from the present disclosure that the message identifiers are not limited to email message identifiers, and more generally are data identifiers associated with data that may be stored on the client device as well as other devices. In some implementations encoding the selected set of message identifiers includes a reversible compression of the selected set of message identifiers. In some implementations encoding the selected set of message identifiers includes an irreversible compression of the selected set of message identifiers. In one example, encoding the selected set of message identifiers comprises generating a hash code (sometimes called a hash value) by applying a one-way hash function to an ordered list (e.g., ordered by message identifier value) of the message identifiers. In another example, encoding the selected set of message identifiers comprises generating a cyclic redundancy code (CRC) by applying a CRC function to an ordered list (e.g., ordered by message identifier value) of the message identifier.

As represented by block 4-2, method 400 includes transmitting the encoded value and a range indicator (sometimes herein called a range identifier) associated with the set of message identifiers to a server (or another device). In some implementations, method 400 also includes transmitting to the server a count value, wherein the count value indicates the number of data identifiers in the set of message identifiers. For example, in some implementations, the count value is transmitted along with the encoded value.

As represented by block 4-3, method 400 includes receiving a remedial set of message identifiers in response to the transmittal of the encoded value and range indicator. In some implementations, the remedial set of message identifiers are pushed to the client device (e.g., transmitted to the client device without receiving a request from the client device for the remedial set of message identifiers) upon evaluation of the encoded value by the server. Additionally and/or alternatively, in some implementations, receiving the remedial set of message identifiers includes a process that includes the client device receiving an agreement indicator from a server, evaluating the agreement indicator to determine that the server identified a mismatch based on the encoded value, and transmitting a request for the remedial set of message identifiers to the server.

Figure 5:
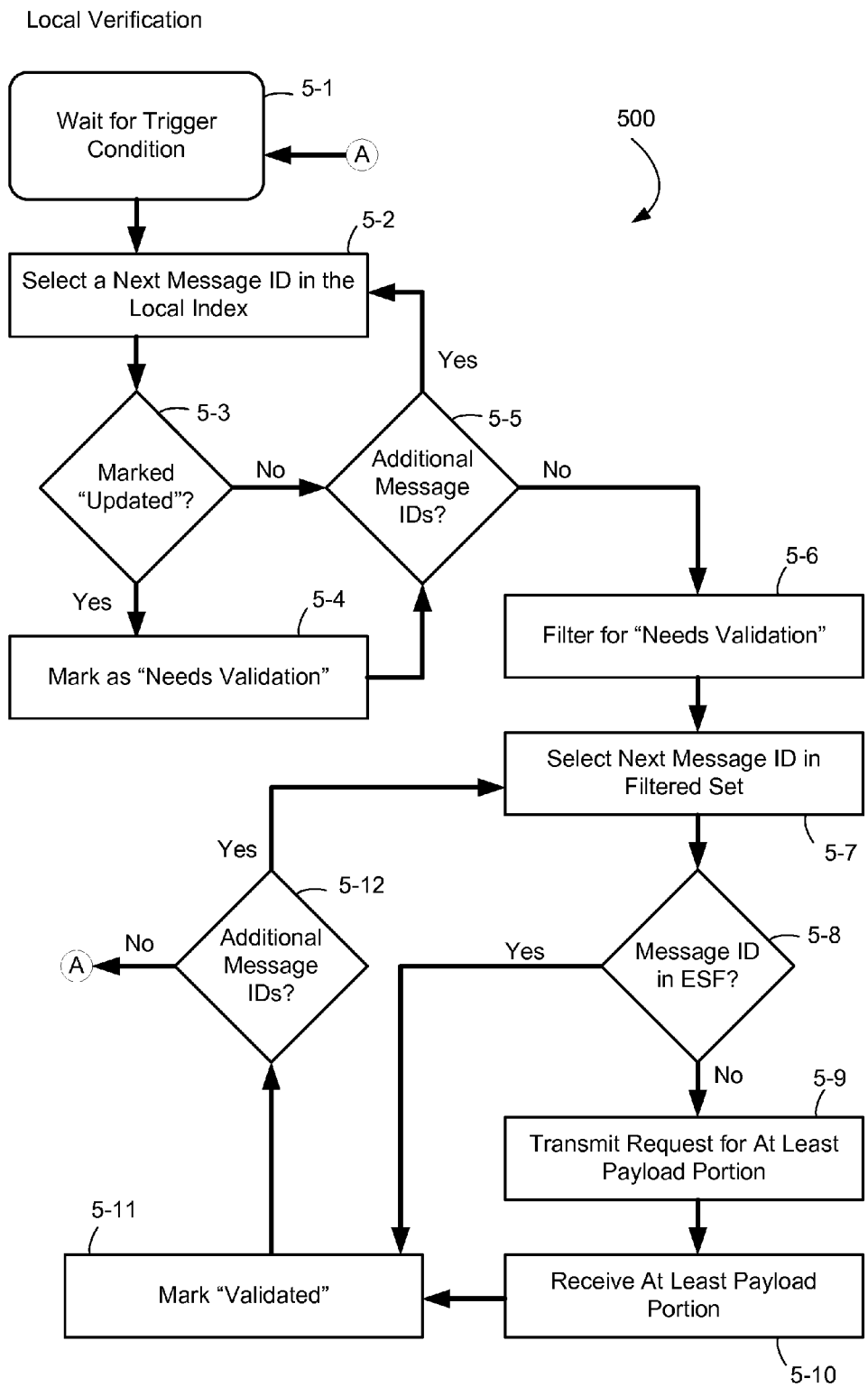
FIG. 5 is a flowchart of an implementation of a client device method, in accordance with some embodiments.

FIG. 5 depicts a flowchart of an implementation of another client device method 500. In some implementations, method 500 is performed by a client device (e.g., client device 120-1, such as a smart-phone, tablet, laptop, personal computer, etc.) in order to check whether data stored on the device is substantially up-to-date with respect to other data that is also stored locally. For example, a locally stored index file (e.g., local index 121, FIG. 2) may include a list of message identifiers corresponding to the messages that should also be stored in an email storage file (e.g., email storage file 123, FIG. 2). In some implementations, as compared to the email storage file 123, the local index 121 (i.e., the locally stored index file) represents a more reliable indication of the email messages previously provided to the client from a server. In some implementations, the local index 121 is more reliable because the contents of the local index are written into a local non-volatile memory of the client device more frequently and/or with less delay after modifications to the locally stored messages than updates to the email storage file 123. As such, the content of the local index 121 is less susceptible to errors or losses of information caused by communication interruptions, software execution interruptions, or other failures. Moreover, while in some implementations a locally stored index file may serve as the more reliable listing of data identifiers, those skilled in the art will appreciate from the present disclosure that any number of file types may be used to store a reliable listing of data identifiers that is used to validate data in a less reliable file or other data structure.

The flowchart in FIG. 5 depicts a method 500 that utilizes the greater reliability of a locally stored index to validate the content of an email storage file. To that end, as represented by block 5-1, method 500 includes waiting for a triggering condition to initiate performance of the remainder of the method. For example, in some implementations the triggering condition includes at least one of the elapse of a threshold amount of time, performance of a threshold number of operations, and/or the initiation of access to a less reliable file type or identifiable memory location.

As represented by block 5-2, method 500 includes selecting a next message identifier in the local index. Stated another way, method 500 includes identifying and selecting a message identifier to process from the local index. Typically, the selected message identifier is a message identifier not yet considered by method 500. In various implementations, the message identifiers are selected in accordance with the order in which they are listed in the local index, the reverse order in which they are listed in the local index, or some other selection pattern and/or criteria.

As represented by block 5-3, method 500 includes determining whether or not the selected message identifier has been marked with a first marker, which, for example, is a marker indicating that a message associated with the selected message identifier has been updated or modified (i.e., the message identifier has been marked as "updated"). If the selected message identifier has been marked with the first marker ("Yes" path from block 5-3), as represented by block 5-4, method 500 includes marking the selected messaged identifier with a second marker, which, for example, is a marker indicating that it is advisable to further validate the message identifier as it relates to the email storage file 123. In some implementations, the second marker is a "needs validation" marker, indicating that the marked message identifier requires validation. On the other hand, if the selected message identifier has not been marked with the first marker ("No" path from block 5-3), as represented by block 5-5, method 500 includes determining whether or not there are additional message identifiers (if any) within the local index are evaluated using the portion of method 500 represented by blocks 5-2, 5-3 and 5-4.

That is, the portion of method 500 represented by block 5-5 includes checking whether the message identifiers in the local index have been considered and processed as a part of the validation. As such, if there are additional message identifiers in the local index that have yet to be considered ("Yes" path from block 5-5), method 500 includes looping back to the portion of method 500 represented by block 5-2. Additionally and/or alternatively, while blocks 5-2 to 5-6 describe an implementation in which the local index is evaluated prior to evaluating the email storage file, in alternative implementations the local index and the email storage file are evaluated concurrently. For example, in some implementations each message identifier marked with the first marker is evaluated with respect to the email storage file, before another message identifier is considered.

On the other hand, if all of the message identifiers in the local index have been evaluated as described above ("No" path from block 5-5), as represented by block 5-6, method 500 includes filtering the local index to identify the message identifiers that have been marked with the second marker (i.e., the message identifier has been marked as "needs validation").

As represented by block 5-7, method 500 includes selecting the next message identifier in the filtered set, in a manner similar to that described above with reference to block 5-2. As represented by block 5-8, method 500 includes determining whether or not the selected message identifier has corresponding data in the email storage file. In some implementations, the corresponding data includes a duplicate copy of the message identifier and a payload portion comprising the content of the email message. However, those skilled in the art will appreciate from the present disclosure that validating the email storage file and the data stored therein is merely one example application of the method described.

If the selected message identifier has corresponding data in the email storage file ("Yes" path from block 5-8), as represented by block 5-12 and described in greater detail below, method 500 includes determining whether there are additional message identifiers in the filtered set. In some implementations, if the selected message identifier has corresponding data in the email storage file ("Yes" path from block 5-8), as represented by block 5-11, method 500 also includes marking the message identifier with a marker indicating that the selected message has been validated.

On the other hand, if the selected message identifier does not have corresponding data in the email storage file ("No" path from block 5-8), as represented by block 5-9, method 500 includes transmitting a request for at least the payload portion of the data missing from the email storage file. As represented by block 5-10, method 500 includes receiving at least the payload portion of the missing data. As represented by block 5-11, method 500 includes marking the selected message identifier with a third marker, which, for example, is a marker indicating that the selected message identifier has been validated.

Additionally and/or alternatively, while blocks 5-7 to 5-12 describe an implementation in which a request for missing data is transmitted each time such data is identified as missing, in alternative implementations the missing data may be requested in one or more batches after multiple data elements are identified as missing. For example, the respective missing payload portions of various email messages may be requested and received based on one or more requests transmitted from a client device.

Returning to block 5-12, if all of the message identifiers in the filtered set have been evaluated ("No" path from block 5-12), method 500 proceeds to the portion of the method represented by block 5-1, waiting for the next trigger condition. On the other hand, if there are additional message identifiers in the filtered set that have yet to be considered ("Yes" path from block 5-12), method 500 includes looping back to the portion of method 500 represented by block 5-7.

Figure 6:
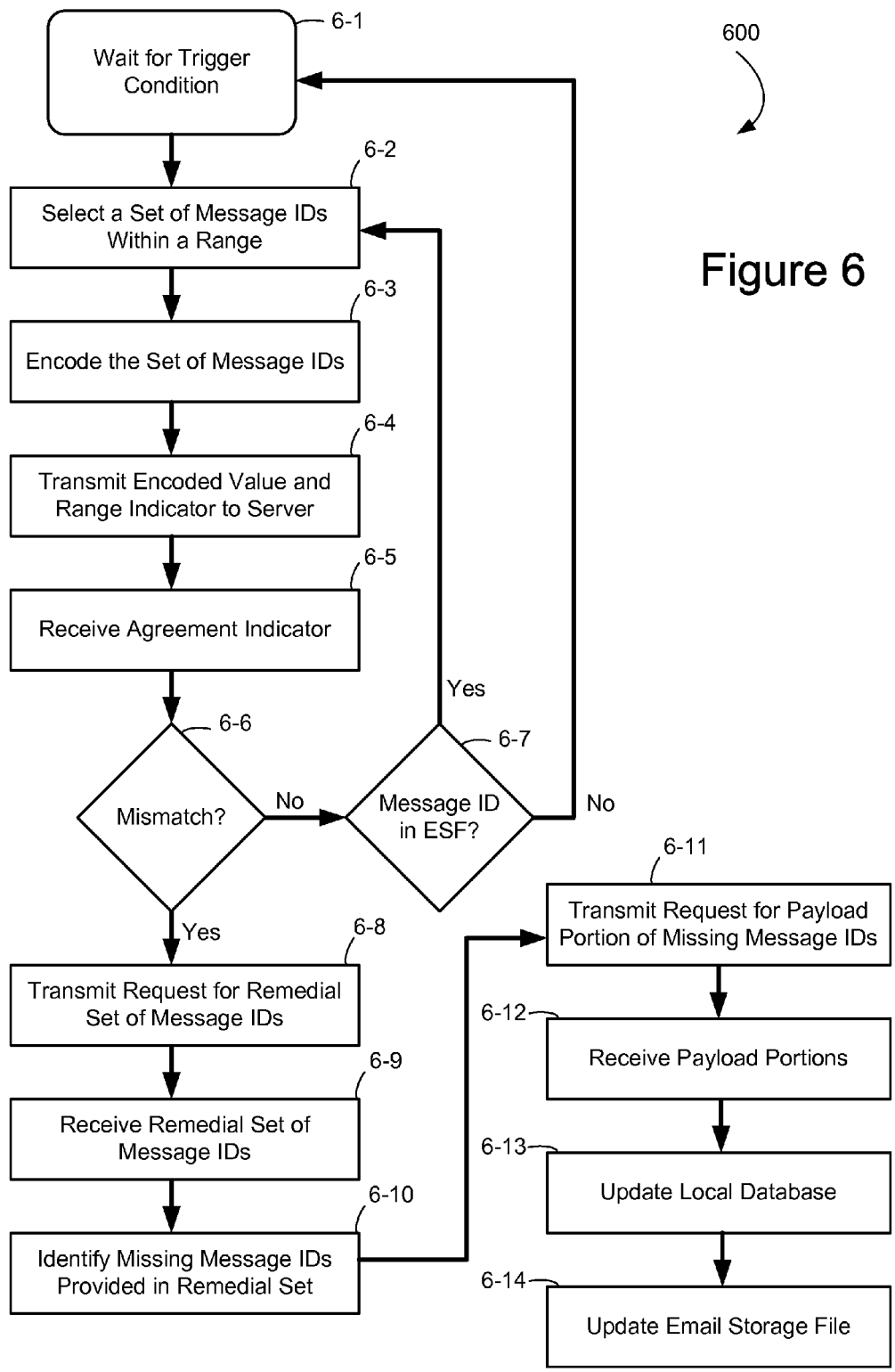
FIG. 6 is a flowchart of an implementation of a client device method, in accordance with some embodiments.

FIG. 6 is a flowchart of an implementation of another client device method.

In some implementations, method 600 is performed by a client device (e.g., smart-phone, tablet, laptop, personal computer, etc.) in order to check whether data stored on the device is up-to-date with respect to data stored on a server (e.g., an email server). To that end, as represented by block 6-1, method 600 includes waiting for a triggering condition to initiate performance of the remainder of the method. For example, in some implementations the triggering condition may include at least one of the elapse of a threshold amount of time and/or the initiation of access to a less reliable file type or identifiable memory location (e.g., accessing an email storage file).

As represented by block 6-2, method 600 includes selecting a set of message identifiers within a range from a locally stored index. In some implementations, the set of message identifiers are selected starting from the lowest message identifier (or lowest data identifier) stored in the memory of the client device. In some implementations, the selected set of message identifiers is bound by high and low message identifiers, and a range indicator for the selected set of message identifiers is associate with the high message identifier, the low message identifier, or both. Furthermore, in some implementations, the selected set of message identifiers is a first set of ordered message identifiers, and that first set is but one of a plurality of sets of ordered data identifiers. For example, when the number of messages exceeds a maximum number of message identifiers to be included in a single set, successive sets of messages are selected during successive iterations of method 600. In another example, when the messages are organized in multiple folders, or are labeled with multiple distinct labels, successive sets of messages (each set for a distinct folder or distinct label) are selected during successive iterations of method 600.

As represented by block 6-3, method 600 includes encoding the selected set of message identifiers to produce an encoded value. In some implementations the set of message identifiers is encoded along with a label or folder identifier, where the label or folder identifier is generally indicative of how one or more messages has been organized either by a user or a computer-implemented method associated with the email application. For example, an email application may allow a user to sort emails into various folders and/or implement an organizational labeling scheme that allows a user to sort emails in a manner that the user finds convenient. Additionally and/or alternatively, the email application may include default folders or labels for similar ends. Additionally and/or alternatively, in some implementations the set of message identifiers is encoded without regard to a label or folder identifier. In some implementations encoding the selected set of message identifiers includes a reversible compression of the selected set of message identifiers. In some implementations encoding the selected set of message identifiers includes an irreversible compression of the selected set of message identifiers.

As represented by block 6-4, method 600 includes transmitting the encoded value and a range indicator associated with the selected set of message identifiers to a server (or another device). In some implementations, method 600 also includes transmitting to the server a count value, wherein the count value indicates the number of data identifiers in the set of message identifiers. For example, in some implementations, the count value is transmitted along with the encoded value.

As represented by block 6-5, method 600 includes receiving an agreement indicator, from the server (or other device), that signals either a match or mismatch between the encoded value transmitted by the client device and a corresponding value determined by the server. As represented by block 6-6, method 600 includes determining whether the agreement indicator signals a mismatch. If the agreement indicator signals that there is a mismatch ("Yes" path from block 6-6), method 600 continues to the portion method 600 represented by blocks 6-8 through 6-14, as discussed in further detail below. On the other hand, if the agreement indicator signals that there is a match ("No" path from block 6-6), as represented by block 6-7, method 600 includes determining whether or not there are additional message identifiers that may be evaluated using the portion of method 600 represented by blocks 6-2 to 6-5.

That is, the portion of method 600 represented by block 6-7 includes checking whether the locally stored message identifiers (e.g., in the local index or email storage file) have been processed. As such, if there are additional message identifiers that have yet to be considered ("Yes" path from block 6-7), method 600 includes looping back to the portion of the method represented by blocks 6-2 to 6-5. On the other hand, if all the locally stored message identifiers have been evaluated ("No" path from block 6-7), method 600 loops back to the portion of the method represented by block 6-1.

In some embodiments, method 600 includes transmitting (6-8) a request for a remedial set of message identifiers upon determining that the agreement indicator signals a mismatch, and receiving (6-9) the remedial set of message identifiers associated with the range indicator in response to the transmitted request for a remedial set of message IDs (6-8). In some implementations, method 600 further includes identifying (6-10) the message identifiers in the remedial set that are missing in the locally stored set of message identifiers, and transmitting (6-11) a request for at least the payload portions of the missing data. Method 600 further includes, in accordance with the transmitted request, receiving the payload portions (6-12), updating the local index (6-13) to include the message identifiers corresponding to the received payload portions, and updating the email storage file to include data from the received payload portions.

Figure 7:
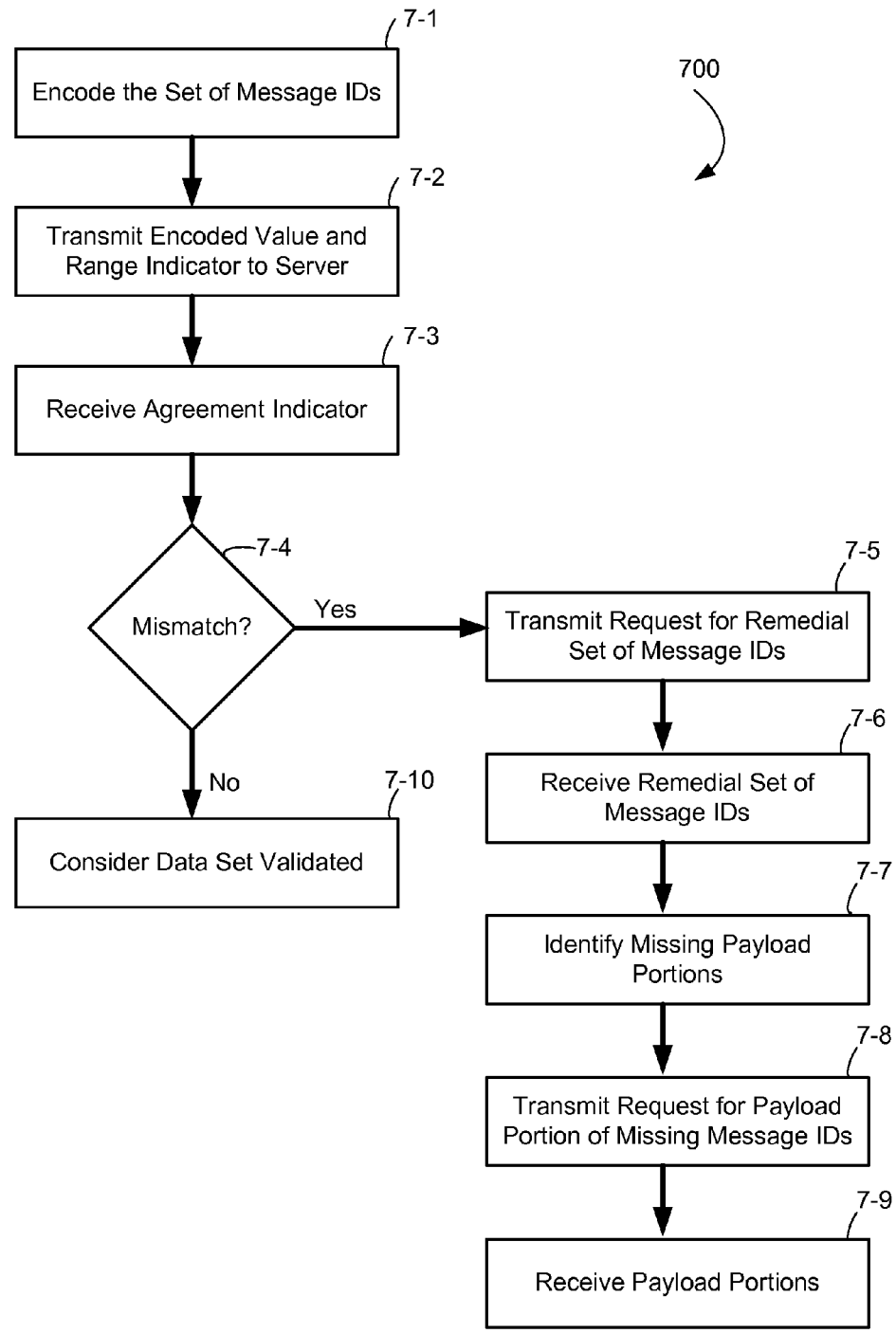
FIG. 7 is a flowchart of an implementation of a client device method, in accordance with some embodiments.

FIG. 7 is a flowchart representation of an example implementation of another client device method 700. In some implementations, method 700 is performed by a client device (e.g., smart-phone, tablet, laptop, personal computer, etc.) in order to check that data stored on the device is up-to-date with respect to other locally stored data (e.g., a log file) and with respect to data stored on a server (e.g., an email server). To that end, as represented by block 7-1, method 700 includes encoding a set of message identifiers from a particular range, which is associated with a range indicator. In some implementations, method 700 includes transmitting (7-2) the encoded value and the range indicator to a server (or another device), and receiving (7-3) an agreement indicator from the server in response to the transmitted encoded value and range indicator.

In some implementations, method 700 further includes determining (7-4) whether the agreement indicator signals a mismatch. If the agreement indicator signals a match ("No" path from block 7-4), as represented by block 7-10, method 700 includes considering the data set as validated. On the other hand, if the agreement indicator signals a mismatch ("Yes" path from block 7-4), as represented by blocks 7-5 and 7-6, method 700 includes transmitting a request for a remedial set of message identifiers, and receiving a remedial set of data identifiers. Method 700 further includes identifying (7-7) missing data elements from the remedial set of message identifiers. For example, the presence of a new message identifier in the remedial set signals the absence of a respective payload portion.

As represented by block 7-8 and 7-9, method 700 includes transmitting a request for the missing data elements (e.g., the missing payload portions), and receiving the missing data elements requested.

Figure 8:
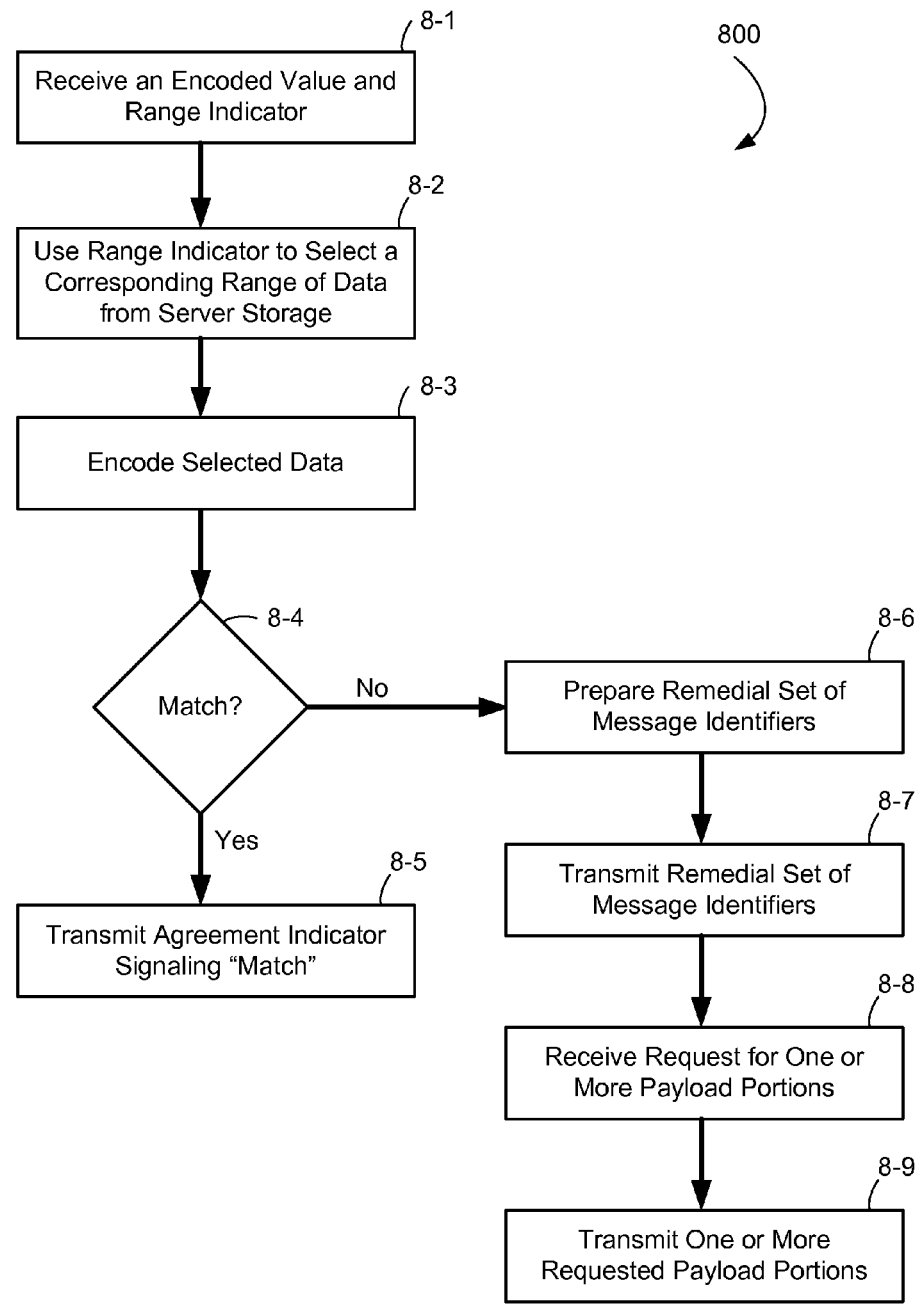
FIG. 8 is a flowchart of an implementation of a server system method, in accordance with some embodiments.

FIG. 8 is a flowchart representation of an example implementation of a server system method 800. In some implementations, method 800 is performed by a server system (e.g., an email server) in order to evaluate whether the data stored on a particular client device is up-to-date, and provide remedial data when mismatches arise. To that end, as represented by block 8-1, method 800 includes receiving an encoded value and a range indicator from a client device. Method 800 further includes using (8-2) the range indicator to select a corresponding range of data from the server storage medium, and encoding (803) the selected range of data. Various ways of encoding the selected range of data are described above with reference to FIG. 4 (see discussion of block 4-1) and 6 (see discussion of block 6-3), and thus those explanations are not repeated here.

As represented by block 8-4, method 800 includes determining whether the encoded value received from the client device and the encoded value produced by the server match. If the two encoded values match ("Yes" path from block 8-4), as represented by block 8-5, method 800 includes transmitting an agreement indicator to the client device that signals a match. On the other hand, if the two encoded values do not match ("No" path from block 8-4), method 800 includes preparing (8-6) a remedial set of message identifiers for the client device, and transmitting (8-7) the remedial set of message identifiers to the client device. As represented by block 8-8, method 800 includes receiving a request for the missing data elements (e.g., the missing payload portions), and as represented by block 8-9, transmitting the missing data elements requested.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art to best utilize various embodiments with various modifications as are suited to the particular use contemplated.

What is claimed is:

1. A computer-implemented method of synchronizing data stored in a first memory of a first device with data stored in a second memory of a second device, the method comprising:
obtaining a range indicator for a first set of ordered data identifiers, the range indicator corresponding to a range of a locally stored index;
encoding the first set of ordered data identifiers, stored in the first memory, to produce an encoded value, wherein the first set of ordered data identifiers is bound in accordance with the range indicator and the encoded value is distinct from the range indicator;
transmitting the encoded value and the range indicator to the second device;
in accordance with a determination by the second device that the encoded value does not match a corresponding value determined by the second device, receiving from the second device a remedial set of ordered data identifiers stored in the second memory, wherein the remedial set of ordered data identifiers is also bound in accordance with the range indicator;
identifying a subset of the data identifiers that are included in the remedial set of ordered data identifiers but not included in a first portion of the first memory, wherein the first portion includes both data identifiers and corresponding payload portions;
requesting that the second device provide payload portions associated with the identified subset of the plurality of data identifiers; and
receiving a data set from the second device, wherein the data set includes a plurality of data identifiers and a corresponding plurality of payload portions, and wherein the data set includes the requested payload portions associated with the identified subset of the plurality of data identifiers.

2. The method of claim 1, further comprising transmitting a count value to the second device, wherein a count value indicates the number of data identifiers in the first set of ordered data identifiers.

3. The method of claim 1, wherein, the second device is an electronic mail server.

4. The method of claim 1, wherein encoding the first set of ordered data identifiers includes encoding constituent data identifiers of the first set and a storage label.

5. The method of claim 4, wherein the storage label includes at least one of a label identifier or a folder identifier.

6. The method of claim 1, further comprising selecting the first set of ordered data identifiers starting from the lowest data identifier stored in the first memory.

7. The method of claim 1, wherein the first set of ordered data identifiers is bound by high and low data identifiers, and the range indicator is associated with at least one of the high and low identifiers.

8. The method of claim 1, wherein the first set of ordered data identifiers comprises one of a plurality of sets of ordered data identifiers.

9. The method of claim 1, further comprising:
receiving an agreement indicator from the second device, wherein the agreement indicator signals one of a match or mismatch between the encoded value transmitted by the first device and the corresponding value determined by the second device; and
requesting a remedial set of ordered data identifiers from the second device in response to receiving an agreement indicator signaling a mismatch, and wherein the remedial set of ordered data identifiers is received in response to the request.

10. The method of claim 1, wherein each payload portion associated with a respective data identifier comprises an electronic mail message.

11. The method of claim 1, further comprising:
storing the plurality of data identifiers in a second portion of the first memory; and
storing the plurality of data identifiers and the corresponding plurality of payload portions in the first portion of the first memory,
wherein the plurality of data identifiers are stored in the second portion of the first memory on a priority basis as compared to the storage of the plurality of data identifiers and the corresponding plurality of payload portions in the first portion of the first memory.

12. The method of claim 11, further comprising verifying local data consistency by:
determining whether the first portion of the first memory includes each of the plurality of data identifiers stored in the second portion of the memory of the first device in response to a triggering condition.

13. The method of claim 12, wherein the triggering condition includes at least one of the passage of a threshold amount of time since a prior verification of local data consistency and access to the first portion of the first memory.

14. The method of claim 12, wherein verifying local data consistency further comprises:
identifying a subset of the plurality of data identifiers not included in the first memory portion in response to determining that the first memory portion does not include each of the plurality of data identifiers stored in the second memory portion; and
requesting the remote source to provide payload portions associated with the identified subset of the plurality of data identifiers.

15. The method of claim 14, wherein identifying the subset of the plurality of data identifiers not included in the first memory portion comprises:
marking at least some of the data identifiers in the second portion of the first memory with a first marker, and
wherein determining whether the first portion of the first non-transitory includes each of the plurality of data identifiers stored in the second portion of the first memory includes determining whether each data identifier marked with the first marker has a corresponding email message in an email storage file; and
changing the mark of a data identifier provided with the first marker to a second marker in response to determining that that particular data identifier has a corresponding email message in the email storage file.

16. The method of claim 1, wherein the encoded value includes a value produced by irreversible compression of all data identifiers in the first set of ordered data identifiers.

17. A non-transitory computer readable storage, storing one or more programs which when executed by one or more processors of a first device cause the first device to:
obtain a range indicator for a first set of ordered data identifiers, the range indicator corresponding to a range of a locally stored index;
encode the first set of ordered data identifiers, stored in the first memory, to produce an encoded value, wherein the first set of ordered data identifiers is bound in accordance with the range indicator and the encoded value is distinct from the range indicator;

transmit the encoded value and the range indicator to the second device;

in accordance with a determination by the second device that the encoded value does not match a corresponding value determined by the second device, receive from the second device a remedial set of ordered data identifiers stored in the second memory, wherein the remedial set of ordered data identifiers is also bound in accordance with the range indicator;

identify a subset of the data identifiers that are included in the remedial set of ordered data identifiers but not included in a first portion of the first memory, wherein the first portion includes both data identifiers and corresponding payload portions;

request that the second device provide payload portions associated with the identified subset of the plurality of data identifiers; and receive a data set from the second device, wherein the data set includes a plurality of data identifiers and a corresponding plurality of payload portions, and wherein the data set includes the requested payload portions associated with the identified subset of the plurality of data identifiers.

18. The non-transitory computer readable storage of claim 17, wherein the one or more programs further include instructions, that when executed by the one or more processors of the first device cause the first device to transmit a count value to the second device, wherein a count value indicates the number of data identifiers in the first set of ordered data identifiers.

19. The non-transitory computer readable storage of claim 17, wherein, the second device is an electronic mail server.

20. The non-transitory computer readable storage of claim 17, wherein encoding the first set of ordered data identifiers includes encoding constituent data identifiers of the first set and a storage label.

21. The non-transitory computer readable storage of claim 20, wherein the storage label includes at least one of a label identifier or a folder identifier.

22. A device, comprising:
one or more processors;
one or more communication interfaces for sending and receiving information;
memory storing one or more programs which when executed by the one or more processors cause the device, comprising a first device, to:
  obtain a range indicator for a first set of ordered data identifiers, the range indicator corresponding to a range of a locally stored index;
  encode the first set of ordered data identifiers, stored in the first memory, to produce an encoded value, wherein the first set of ordered data identifiers is bound in accordance with the range indicator and the encoded value is distinct from the range indicator;
  transmit the encoded value and the range indicator to the second device;
  in accordance with a determination by the second device that the encoded value does not match a corresponding value determined by the second device, receive from the second device a remedial set of ordered data identifiers stored in the second memory, wherein the remedial set of ordered data identifiers is also bound in accordance with the range indicator;
  identify a subset of the data identifiers that are included in the remedial set of ordered data identifiers but not included in a first portion of the first memory, wherein the first portion includes both data identifiers and corresponding payload portions;
  request that the second device provide payload portions associated with the identified subset of the plurality of data identifiers; and
  receive a data set from the second device, wherein the data set includes a plurality of data identifiers and a corresponding plurality of payload portions, and wherein the data set includes the requested payload portions associated with the identified subset of the plurality of data identifiers.

23. The device of claim 22, wherein the one or more programs further include instructions, that when executed by the one or more processors of the first device cause the first device to transmit a count value to the second device, wherein a count value indicates the number of data identifiers in the first set of ordered data identifiers.

24. The device of claim 22, wherein, the second device is an electronic mail server.

25. The device of claim 22, wherein encoding the first set of ordered data identifiers includes encoding constituent data identifiers of the first set and a storage label.

26. The device of claim 25, wherein the storage label includes at least one of a label identifier or a folder identifier.

27. A computer-implemented method of synchronizing data stored in a first memory of a first device with data stored in a second memory of a second device, the method comprising:
receiving, from the second device, information associated with a first set of ordered data identifiers stored on the second device, the information including:
  a range indicator corresponding to a range of a stored index on the second device; and
  a first encoded value produced from encoding the first set of ordered data identifiers, wherein the first set of ordered data identifiers is bound in accordance with the range indicator, and wherein the first encoded value is distinct from the range indicator;
encoding a second set of ordered data identifiers associated with the received range indicator to produce a second encoded value, wherein the second set of ordered data identifiers are stored on the first device and, wherein the second encoded value is distinct from the range indicator;
determining whether the first set of data identifiers matches the second set of data identifiers by at least comparing the first encoded value to the second encoded value;
initiating a remedial process in response to determining that the first encoded value does not match the second encoded value, including sending to the second device a remedial set of ordered data identifiers bounded by the range indicator;
receiving a request from the second device to provide one or more payload portions corresponding to at least a subset of data identifiers in the remedial set, wherein the at least a subset of the data identifiers are not included in the first set of ordered data identifiers;
sending a data set to the second device, the data set including a plurality of data identifiers and a corresponding plurality of payload portions, wherein the data set includes the requested one or more payload portions corresponding to the at least a subset of the data identifiers.

28. The method of claim 27, wherein the information further comprises a count value that represents the number of data identifiers in the first set of data identifiers.

\* \* \* \* \*